United States Patent [19]

Taylor, Jr. et al.

[11] Patent Number: 5,177,487
[45] Date of Patent: Jan. 5, 1993

[54] SEA VELOCITY EVALUATOR

[75] Inventors: John W. Taylor, Jr.; Antonio Lo Brutto; Vernon W. Gude, Jr., all of Baltimore, Md.

[73] Assignee: Westinghouse Electric Corp., Pittsburgh, Pa.

[21] Appl. No.: 644,370

[22] Filed: Jan. 22, 1991

[51] Int. Cl.[5] ............... G01S 13/524; G01S 13/95
[52] U.S. Cl. ............................ 342/159; 342/26; 342/101; 342/105; 342/107
[58] Field of Search ............ 342/159, 101, 93, 26, 342/105, 107

[56] References Cited

U.S. PATENT DOCUMENTS

| 4,172,255 | 10/1979 | Barrick et al. | 342/26 |
| 4,394,658 | 7/1983 | Short, III | 342/159 X |
| 4,709,236 | 11/1987 | Taylor, Jr. | 342/101 |

OTHER PUBLICATIONS

*McGraw-Hill Dictionary of Scientific and Technical Terms*, Third Ed., 1984, pp. 104, 985 and 989.

Primary Examiner—Gilberto Barrón, Jr.
Attorney, Agent, or Firm—W. G. Sutcliff

[57] ABSTRACT

Sea clutter can be removed from radar signals by accurately determining sea velocity in a coverage area of a radar scan, updating a median value for the coverage area, and selecting a clutter rejection filter for the coverage area biased on the median value for the coverage area. Preferably, a median sea velocity is stored for each coverage area, as the median value. When processing begins for a coverage area, a previously stored median sea velocity is retrieved and updated. The median sea velocity is updated by converting the median sea velocity into a median phase difference between two echo signals, based upon carrier frequency and the time between receipt of two echo signals, which is preferably more than one interpulse period. The difference in phase between the two echo signals is compared with the median phase difference and the median sea velocity is increased if the median phase difference is smaller and decreased if the median phase difference is larger. A rejection filter is selected based upon the previously stored median sea velocity (preferably after adjustment based on the carrier frequency) to remove the echoes from the sea from the radar echo signals.

18 Claims, 5 Drawing Sheets

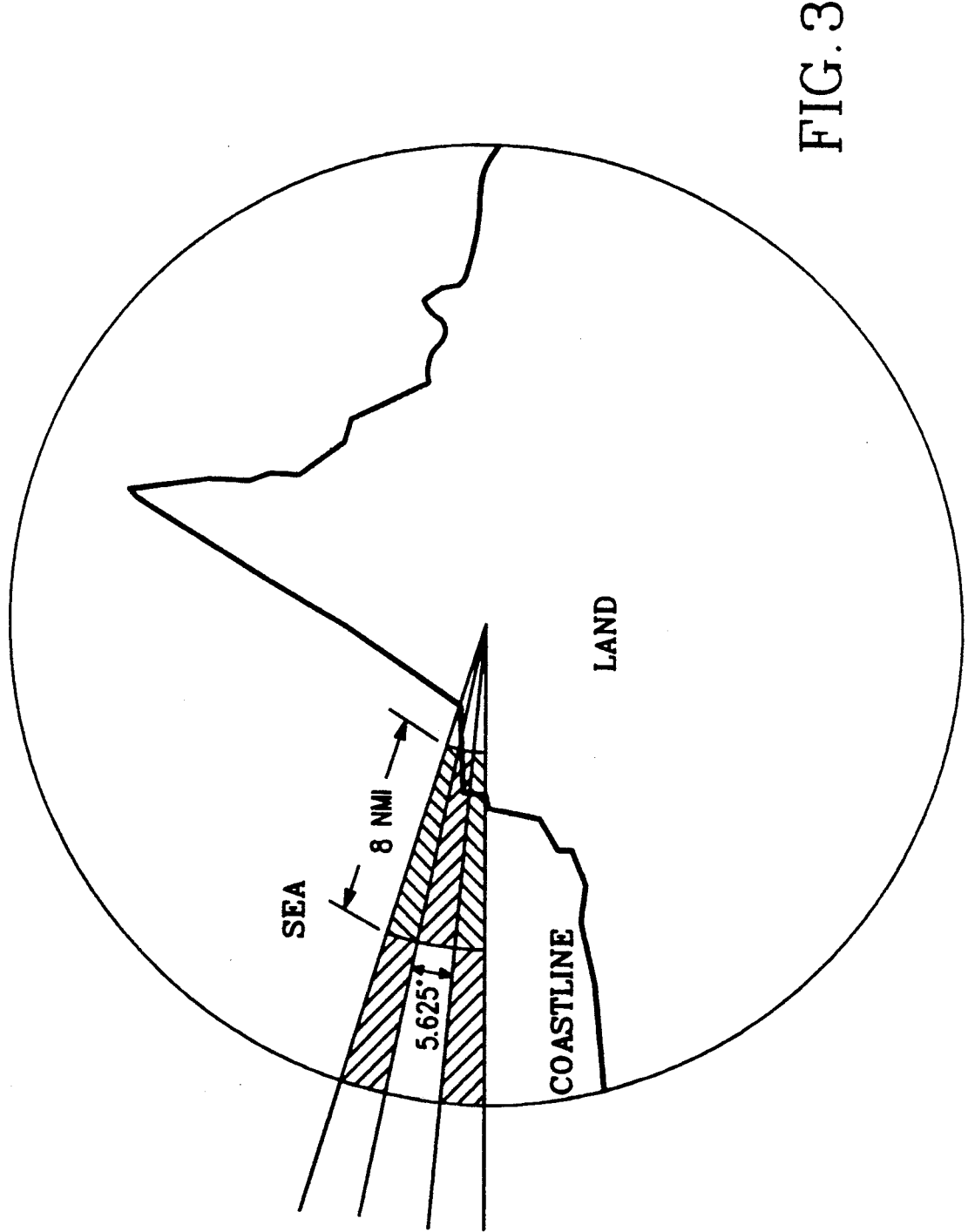

SEA VELOCITY EVALUATOR

BACKGROUND OF THE INVENTION

1. Field of the Invention

This invention relates to a sea velocity evaluator for accurately determining the velocity of radar echoes from waves in the sea in real time and, more particularly, to a method and apparatus for removing sea clutter from radar signals by continuously determining the sea velocity for a predetermined segment of a radar scan, and automatically selecting a filter centered at that velocity.

2. Description of the Related Art

Clutter is produced by unwanted radar echoes which clutter radar output and make the detection of targets difficult. It is well known that sea clutter should be filtered out of radar signals prior to analyzing the radar signals for the detection of targets. Both amplitude and Doppler spectrum of echoes received from the surface of the sea are dependent upon geographically and temporally variable parameters such as wave height, wind speed, direction of the waves relative to the radar beam, the presence of swells or waves, and the like. Nevertheless, since the sea is relatively uniform over areas of modest size, its average velocity (Doppler frequency) can be estimated. It is also known that once the average sea velocity is estimated, the sea clutter can be removed from the radar signals using a filter. Namely, a rejection filter can be centered on the average sea velocity to filter out the sea clutter from the radar signals.

Two techniques have been employed in the past to filter out sea clutter. Sea clutter could not be fully suppressed and target detection was hindered using these known techniques.

With the first technique, the radar system typically includes a rejection filter with a fixed rejection notch centered on a Doppler frequency of zero. Doppler frequency refers to a Doppler shift which corresponds to an amount of change in the observed frequency of an echo signal due to the relative motion of the radar system and the target. This rejection filter, together with a voltage-controlled local oscillator in a superheterodyne receiver which acts to keep the sea clutter within the rejection notch of the filter, attempts to suppress sea clutter by altering the echo frequency as the radar system scans in azimuth. This first technique treats echoes from all ranges of a radar scan commonly, thus reducing accuracy, because sea state is not constant over large geographic areas.

With the second technique, the radar system had to be physically disrupted periodically to make adjustments. The system used either a manual or an automatic selection of rejection filters from a few available choices using map zones having range and azimuth. The selection of the rejection filter was determined by whichever filter achieved the minimum total echo energy from all the echoes including targets as well as sea clutter. In effect, the rejection filter was selected on a trial and error basis in which the rejection filter which resulted in the minimum energy output or the fewest alarms was selected.

During the readjustment of the rejection filter in the second method, the radar output is cluttered and must be ignored. In other words, the radar system is out of commission during readjustment. As a result, the time period between readjustments had to be carefully selected to balance between too frequent disruptions in radar output and too slow response to changed sea conditions. Also, this second technique could not compensate for gradual change of the sea state occurring between readjustments of the rejection filter. The prior art techniques were not only inaccurate, but also produced erroneous measurements due to the presence of ships, rain, cellular storms, and the like. Further, both methods associated with the prior art could not accurately compensate for agile changes in carrier frequency because a change in carrier frequency causes a change in Doppler frequency. To partially compensate for this inability, the prior art techniques used filters with wide rejection bands. However, using filters with wide rejection bands reduces target detection by the radar systems associated with the prior art.

SUMMARY OF THE INVENTION

An object of the present invention to provide a sea velocity evaluator which determines a median sea echo velocity for a predetermined segment of a radar scan with minimal vulnerability to moving targets, pulse interference, rain and the like.

Another object of the present invention to provide a method for removing sea clutter from radar signals by continuously determining a median sea velocity value and automatically selecting a filter in accordance with the median sea velocity value determined.

A further object of the present invention to provide a method for removing sea clutter from radar signals without disrupting normal operation of the radar system and for automatically compensating for sudden changes in carrier frequency.

Yet another object of the present invention to provide an apparatus for removing sea clutter from radar signals by periodically selecting a sea clutter rejection filter based on a continuously determined median sea velocity value.

The above objects are attained by providing a method for determining sea velocity from radar echo signals, said method comprising the steps of: dividing a radar scan into a plurality of coverage areas; and computing the sea velocity for each coverage area based on the radar echo signals received therefrom. Preferably, a median sea velocity is stored for each coverage area. When processing begins for a coverage area, the previously stored median sea velocity is retrieved and updated. The median sea velocity is updated by converting the median sea velocity into a median phase difference between two echo signals, based upon carrier frequency and the time between receipt of two echo signals, which is preferably more than one interpulse period. The difference in phase between the two echo signals is compared with the median phase difference and the median sea velocity is increased if the median phase difference is smaller and decreased if the median phase difference is larger. A rejection filter is selected based upon the previously stored median sea velocity (preferably after adjustment based on the carrier frequency) to remove the echoes from the sea from the radar echo signals.

These objects together with other objects and advantages which will be subsequently apparent, reside in the details of the construction and operation as ore fully hereinafter described and claimed, reference being had to the accompanying drawings forming a part hereof, wherein like numerals refer to like parts throughout.

BRIEF DESCRIPTION OF THE DRAWINGS

FIG. 3 is a chart illustrating a preferred range and azimuth size of a predetermined segment.

DESCRIPTION OF THE PREFERRED EMBODIMENTS

Figure 1:
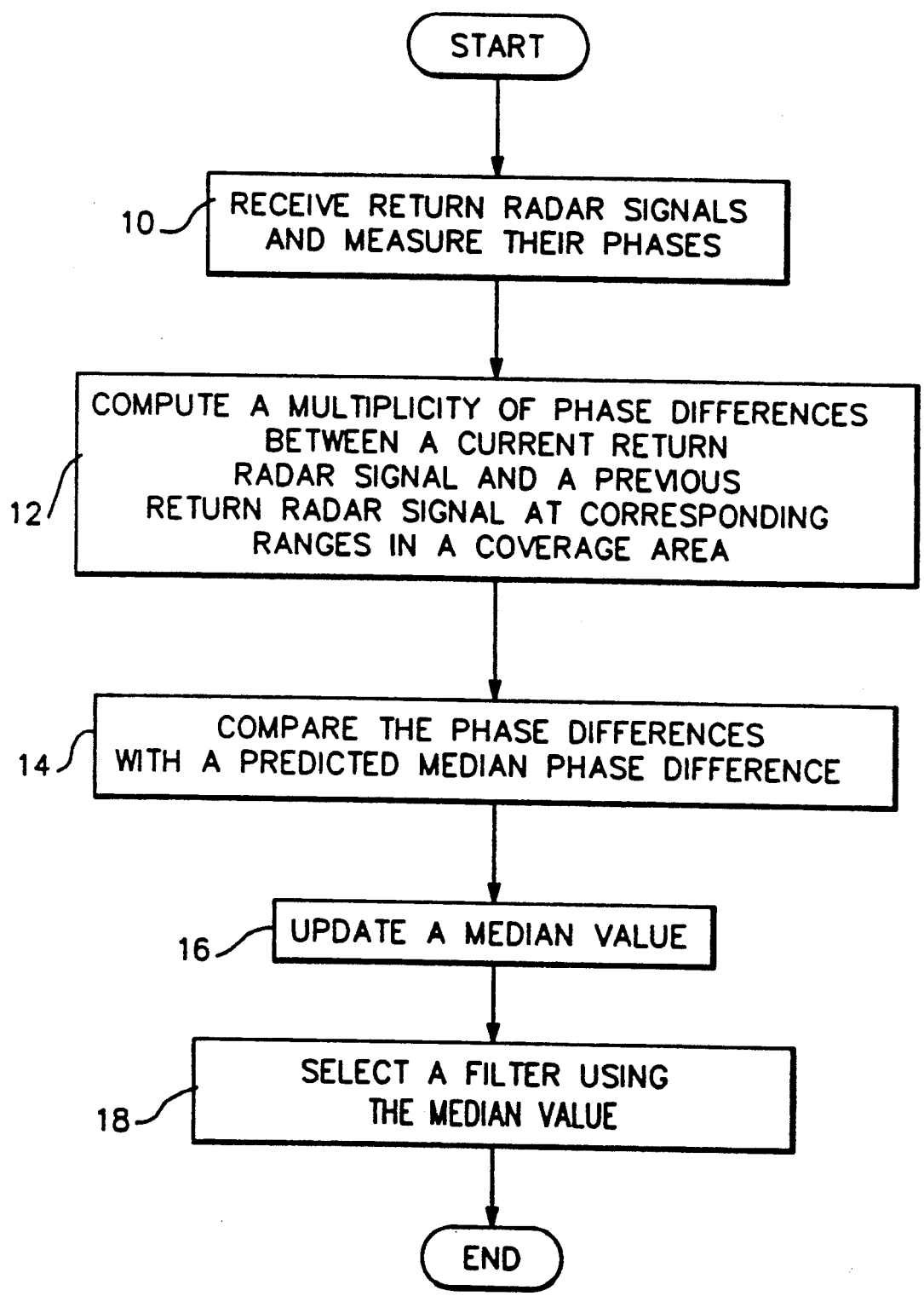
FIG. 1 is a flowchart illustrating basic principles of the present invention.

FIG. 1 is a flowchart illustrating basic principles of the present invention. A radar system transmits electromagnetic radiation and receives (10) echo signals which are reradiated by reflecting objects. The reflecting objects include, for example, targets and the sea. The present invention uses the normal channel of a radar system which does not subject the received echo signals to any Doppler filtering. The preferred embodiment is used in a digital radar system in which the echo signals, otherwise known as return radar signals, are received, sampled and converted to digital values in the form of echo vectors having cartesian coordinates at a multiplicity of closely-spaced sampling points covering the instrumental range of the radar. The phases of the echo signals are obtained from the echo vectors.

Next, a phase difference between a current radar signal and a previous return radar signal is computed (12). A previous return radar signal is produced by storing a return radar signal for one or more interpulse periods. In effect, the storing acts to delay the return radar signal by one or more interpulse periods. An interpulse period is the period of time between the transmission of successive radiation pulses by the transmitting unit of the radar system. Using a phase difference obtained over multiple interpulse periods enables discrimination between narrow-spectrum sea clutter and broad-spectrum rain clutter, thereby permitting the narrow spectrum sea clutter to be measured with reduced corruption by broad-spectrum rain clutter. The present invention filters out the narrow-spectrum sea clutter, but the parameters of a radar often make it impossible to filter out broad-spectrum rain clutter because the width of the spectrum is dependent on wind conditions and is often a large function of the pulse repetition frequency. Therefore, other techniques are used to suppress broad-spectrum rain clutter.

Although a delay of one interpulse period can be used, preferably, the present invention utilizes a delay of two or more interpulse periods. A delay of multiple interpulse periods results in decreasing the maximum velocity within the system ambiguity. Ambiguity refers to the maximum velocity or Doppler shift the system can measure without gross error. Delay results in ambiguity due to the fact that if the echo moves a half-wavelength in range during the delay, it produces a phase difference of zero. That is, the radar system would incorrectly detect a velocity of zero.

For example, when the delay is two interpulse periods, each averaging 4630 $\mu$sec, the system ambiguity is around 12 knots. This is appropriate for measuring sea echo velocity which should not exceed $\pm 6$ knots. On the other hand, wind-blown rain typically has a spectrum broader than 12 knots, and the ambiguity makes the measured phase difference nearly random. This reduces error created by strong cellular rain occupying a portion of the geographic coverage area where sea velocity is being measured.

After the phase difference is computed (12), it is compared (14) with a previously determined (i.e., predicted) median phase difference of the radar pulse. The median phase difference is proportional (see equation 1) to the product of three variables: the average velocity of the sea, the carrier frequency of the radar pulse, and the time delay. A median value which is proportional to the median phase difference is updated (16) in accordance with the results of the comparing in step 14. That is, the median value is adjusted to make the median value more accurately reflect the actual average velocity of the sea clutter. The median value is preferably stored as a median range rate, so that rapid change in interpulse period and/or carrier frequency can be compensated more easily. However, it could be represented as the median phase difference or Doppler shift. Therefore, the comparing in step 14 need not compare phase differences; it can alternatively compare range rates or Doppler shifts in a like manner.

The median value can be updated (16) by incrementing by 1 if the measured phase difference is greater than the predicted median phase difference and decrementing by one if it is less. Alternatively, a mean range rate could be stored and updated (16) by a fraction of the difference between the measured phase difference and the predicted phase difference, but it would be more easily distorted by extraneous pulse interference, ships and other echo sources within the range-azimuth zone.

Next, a filter is selected (18) in accordance with a previously stored median value for the next coverage area, so that the sea clutter is filtered out of the radar signals. Preferably, the previously stored median value is adjusted using the transmit frequency of the next scan to account for Doppler frequency shifts in the return radar signals. The adjusted median Doppler frequency is used to make the filter selection. Namely, by selecting a filter dependent upon the median value of the sea clutter, which is continuously updated, the sea clutter can be effectively suppressed. As a result, the present invention provides a method for continuously and accurately determining the velocity of the sea, while not being overly sensitive to moving targets, pulse interference, rain, and the like.

Figure 2A:
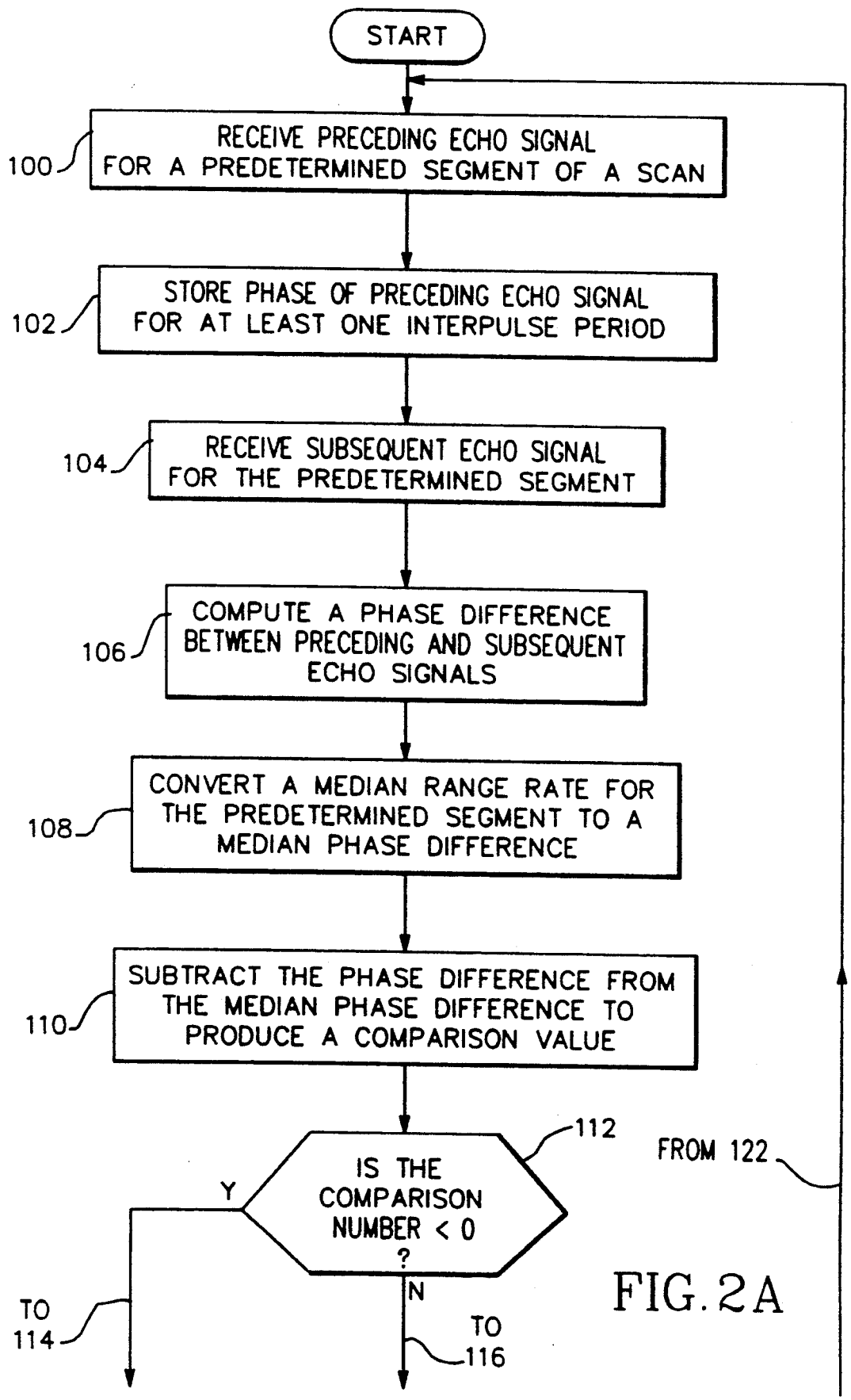
FIGS. 2(A) and 2(B) are flowcharts illustrating an embodiment of the present invention.
Figure 2B:
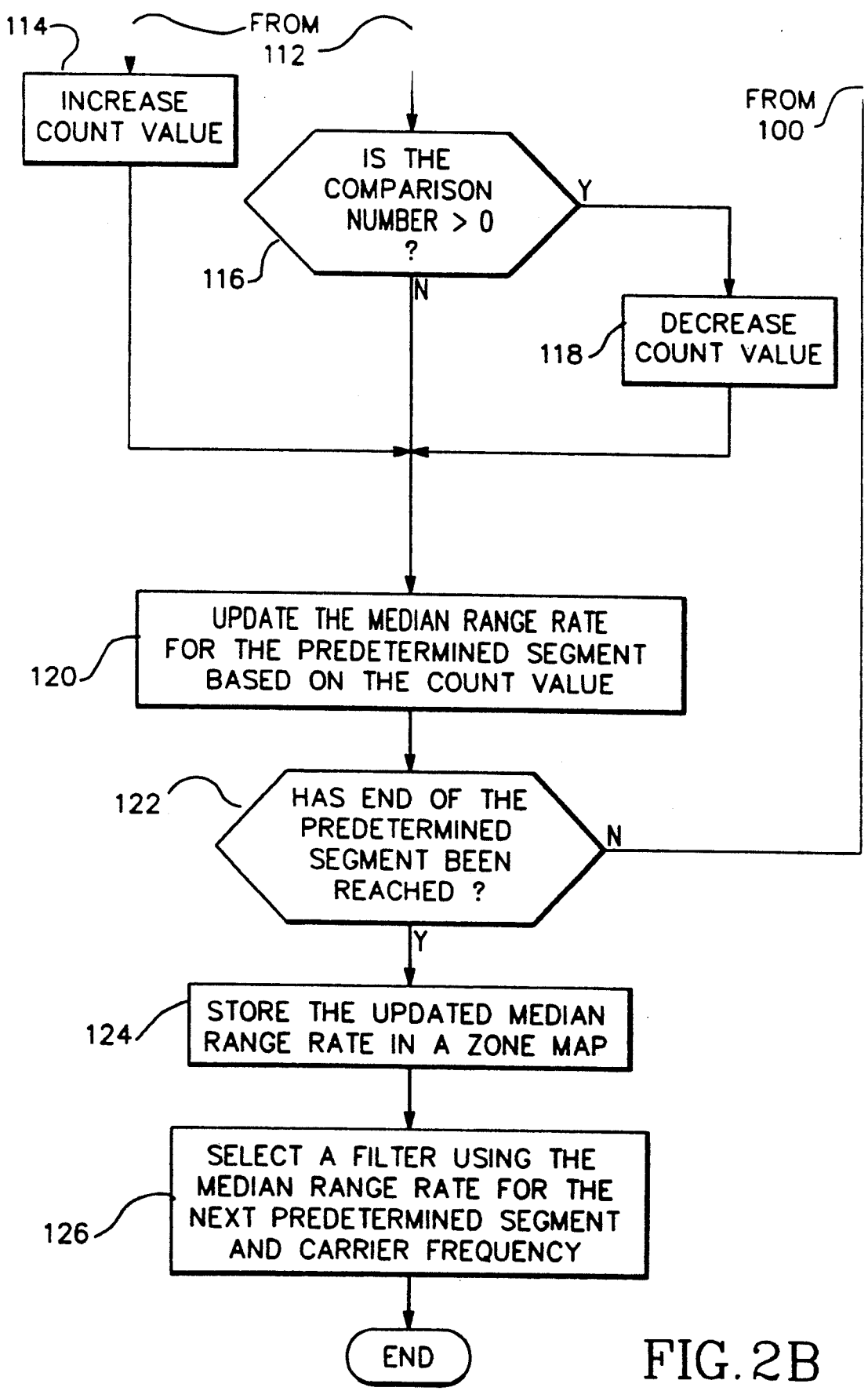

FIGS. 2(A) and 2(B) are flowcharts illustrating an embodiment of the present invention. The method illustrated in FIGS. 2(A) and 2(B) operates to continuously determine the median sea velocity for a geographic zone viewed by a radar system. Thereafter, the method can be used to select a filter in accordance with the median sea velocity to suppress the sea clutter.

As illustrated in FIG. 2A, processing for a predetermined segment begins when a preceding echo signal in a radar scan is received (100). The predetermined segment of a radar scan can be an azimuth region of the radar scan. However, preferably, the predetermined segment is a coverage area which corresponds to a small geographic zone of the radar system. The coverage area is formed by dividing the radar scan by both range and azimuth. Each coverage area, for example, could be projected onto a sector of an annulus in the horizontal plane which is eight nautical miles by 5.625° as illustrated in FIG. 3. Thus, each coverage area is referred to below as a range azimuth gate (RAG) because the zones are divided by range and azimuth.

As illustrated in FIG. 3, if the present invention is used in a stationary radar system, a land/sea map may be included. The land/sea map is constructed for a predetermined geographic region to indicate which portions of the geographic region correspond to land and which portions of the region correspond to sea. Then, all received samples of a predetermined segment which correspond to a region over land can be discarded by the sea velocity evaluator, thus leaving only samples corresponding to the sea. An example of a map is a fine grain map with resolution on the order of one-eighth of a nautical mile by 1.4°.

Eventually, the present invention receives all the echo signals for each of the predetermined segments. The number of echo signals within each RAG is typically in the neighborhood of 10,000 echo signals. As the echo signals for a predetermined segment are received, the echo signals are processed as follows.

The phase of a preceding echo signal in a predetermined segment is measured and stored (102) for one or more interpulse periods. The purpose of this step is to facilitate the determining of the phase difference over one or more interpulse periods as previously described with respect to FIG. 1.

When a subsequent echo signal within the predetermined segment is received (104), a phase difference between the preceding and subsequent echo signals can be calculated (106). Typically, the phase of the preceding echo signal which has been delayed by one or more interpulse periods (by two in the preferred embodiment) due to its storage is subtracted from the phase of the subsequent echo signal. The resulting phase difference is proportional to the velocity of the echo associated with a pair of signals in a RAG.

As the return radar (echo) signals are received in steps 100 and 104, any signals received from a range-azimuth cell above land can be discarded, as discussed above with respect to FIG. 3. In addition, some radar systems frequently, or at least occasionally, change carrier frequency, as opposed to repeatedly sending out bursts of multiple pulses in close succession at different frequencies, with the same set of frequencies used in each burst. When a change in carrier frequency causes the subsequent echo signal to have a carrier frequency which is different than the carrier frequency of the preceding echo signal, the phase difference will be distorted. The distorted phase difference can be processed like all other phase differences, provided there are a sufficient number of samples in each RAG, the carrier frequency does not change very often and the additional noise in the system is acceptable. If these conditions are not met, distorted phase differences can be discarded in a manner similar to echo signals received from a range-azimuth cell above land, whenever the carrier frequency of the preceding and subsequent echo signals is not the same.

After the phase difference has been calculated, a previously determined and stored median range rate for the predetermined segment is converted (108) to a median phase difference. That is, to easily compensate for changing interpulse periods and carrier frequencies, the median range rate which has been previously stored for the current RAG is converted into a median phase difference. The equation for such conversion is $$\Delta\theta = 2\pi \cdot Fd \cdot [T(n + 2) - T(n)]. \quad (1)$$

$$\text{where } Fd = \frac{2 \cdot V}{c} \cdot F_0.$$

$F_0$=transmitting frequency, c=speed of light, V=range rate (velocity), and $T(n+2)-T(n)$=time between samples (i.e., two interpulse periods).

Note, however, processing could also be performed using range rates or Doppler shifts which like the median phase difference expresses the velocity of the sea. The method illustrated in FIGS. 2(A) and 2(B) utilizes a combination of range rate and phase difference to represent the velocity of the sea, because the proportionality factor is a function of dynamic variation in interpulse period and carrier frequency.

Next, the phase difference, computed at 106, is subtracted (110) from the median phase difference produced in step 108. The result of the subtraction operation indicates whether the median phase difference is less than, equal to, or greater than the phase difference for the pair of signals within the current RAG being processed. If the result indicates that the median phase difference is greater than the phase difference of the pair of signals, then a count value is decreased (116, 118). On the other hand, if the result indicates that the median phase difference is less than the phase difference of the pair of signals, the count value is increased (112, 114). As indicated in FIGS. 2A and 2B, when the measured and median phase differences are equal, the count value is not changed.

Next, it is determined (122) whether or not the end of the predetermined segment (RAG) has been reached. The end of the predetermined segment indicates all the echo signals within the RAG have been processed. If the end has not been reached, the processing of the method returns to step 100 to receive subsequent echo signals within the same RAG of the radar scan. On the other hand, if it is determined (122) that the end of the predetermined segment has been reached, then all of the signals associated with the current RAG have been processed.

The updated median range rate is then stored (124) in a zone map. The zone map stores a median range rate (or a value corresponding thereto) for each RAG. Thereafter, the next time the predetermined segment is processed, a filter for suppressing the sea clutter can be selected (126) using the updated median range rate stored at the end of the previous scan over that RAG and the carrier frequency in use at the time that the filter is selected. During the first scan of an area, the range rates in the zone map are preferably set to zero, so that the stored median range rate in any cell can quickly converge to maximum velocity in either direction, e.g., ±6 knots. In addition, the count value is initially preset to correspond to the median range rate previously determined for the RAG.

The median range rate corresponds to the sea velocity for the RAG, and it is stored with several more bits than used for the phase difference or the median phase difference. Preferably, a predetermined number of count value changes, on the order of 128 count value changes, is required to cause a change in filter selection. Thus, the filter choice would be updated (126) only after 128 count value changes have accumulated in either a positive or negative direction. This provides a desired sluggishness in the updating (126) of the filter choice associated with the sea velocity of the predetermined segment which prevents drift due to echo signals resulting from, for example, aircraft and birds, as opposed to the sea.

Similarly, after the median range rate is adjusted by the carrier frequency to account for Doppler frequency, only the most significant bits are used to select a filter. Thus the filter choice is affected only when a predetermined number of count value changes in one direction have occurred. In the previous example, if the delay between echo signals received in steps 100 and 104 is two interpulse periods, then filters can be selected (126), ranging from −6.25 knots to +6.25 knots. For example, 26 filters providing increments of 0.5 knots can be used to cover sea velocities in this range.

Note, the updated median range rate is preferably not utilized until the next time the same RAG is processed because re-selecting a rejection filter during processing of a RAG would introduce transients into the system. Even with a one scan delay, the selected filter effectively suppresses sea clutter from echo signals within each RAG. Thus, the present invention results in improved target detection. The updating (120) of the median range rate for a predetermined segment is performed at the same time as the processing to detect targets.

Figure 4:
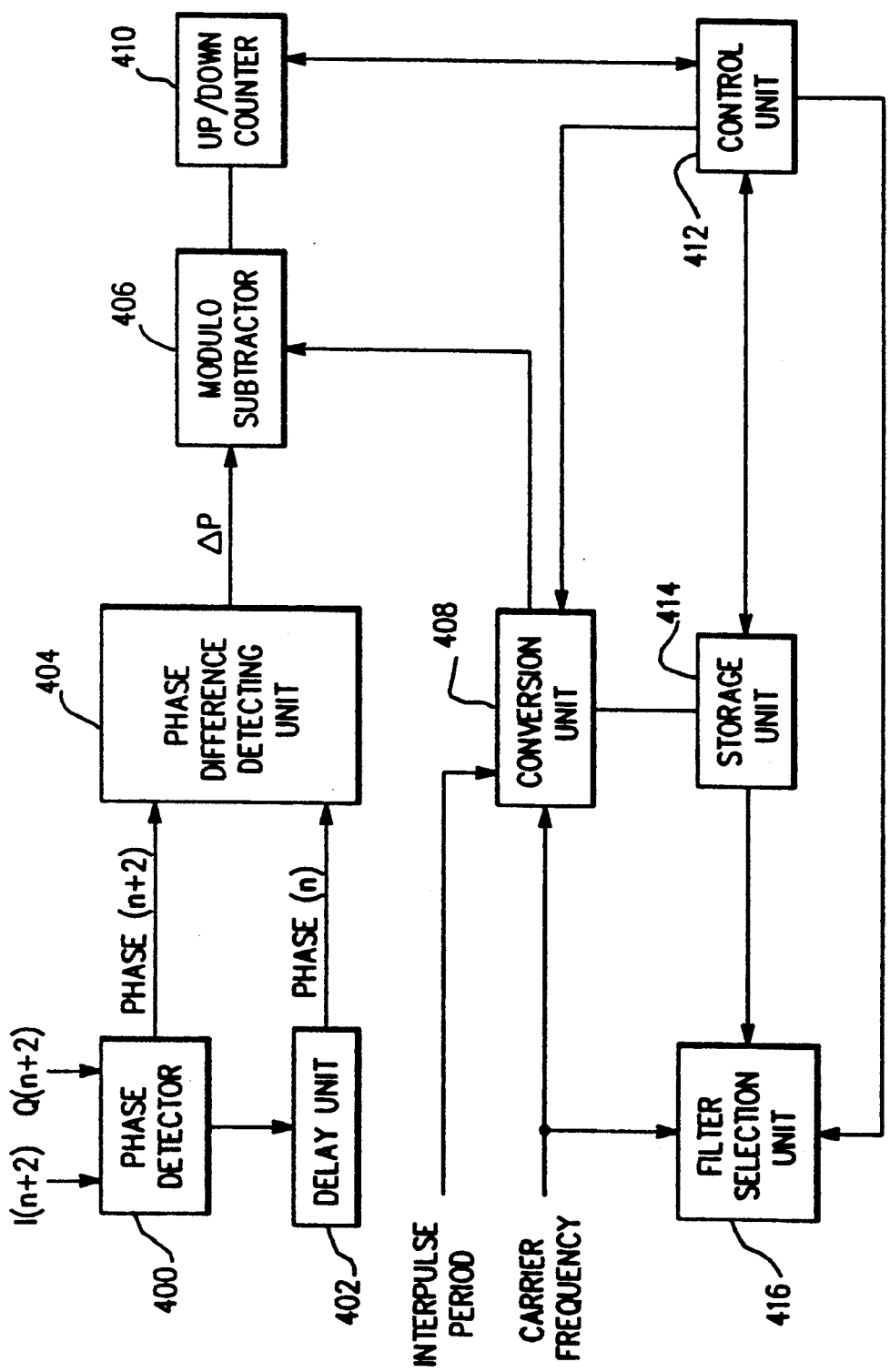
FIG. 4 is a block diagram illustrating an apparatus for performing the method of the present invention.

FIG. 4 is a block diagram illustrating an apparatus for performing the method of the present invention in a digital radar system. Phase detector 400 receives the cartesian coordinates associated with an echo vector in one range-azimuth cell within a RAG. The phase detector 400 detects the phase of each of the incoming input signals to the radar system.

The phase detector 400 can be constructed in a number of ways. The preferred construction of the phase detector 400 is described in U.S. patent application Ser. No. 07/266,195, entitled Digital Phase Detector, and filed on Nov. 2, 1988, which issued as U.S. Pat. No. 5,001,489 and is hereby incorporated by reference. Further, conventional phase detectors are easily constructed by those with ordinary skill in the art using, for example, the well known mathematical approach of taking the tangent of the angle between the two cartesian coordinates of the echo signal. However, such processing is cumbersome to a digital computer utilizing software to detect the phase, thus making specialized digital hardware desirable, in particular the phase detector described in patent application Ser. No. 07/266,195.

A delay unit 402 respectively stores the phase signals produced by the phase detector 400 to delay the phase signals by one or more interpulse periods and preferably two or more interpulse periods. A delay of two interpulse periods is illustrated in FIG. 4.

A phase difference detecting unit 404 receives the undelayed phase signal from the phase detector 400 and the delayed phase signal from the delay unit 402. The phase difference detecting unit 404 then computes the phase difference by subtracting the delayed phase signal from the undelayed phase signal.

The phase difference is subtracted by a modulo subtractor 406 from the median phase difference supplied by a conversion unit 408. The result of the subtraction is provided as an increment or decrement signal to an up/down counter 410. The up/down counter 410 may be a twelve bit digital counter to calculate a twelve bit representation sea velocity, with the least significant seven bits of the counter 410 providing sluggishness. The twelve bit value from the up/down counter 410 is converted into Doppler frequency and the most significant five bits are used in selecting a Doppler filter. A storage control unit 410 receives the median range rate and controls the operation of the conversion unit 408, a storage unit 414 and a filter selection unit 416. In addition, the control unit 412 stores the initial median range rate in the up/down counter 410 at the beginning of each RAG period.

The storage unit 414 stores a median value, which corresponds to sea velocity, for each RAG. That is, the storage unit 414 stores a zone map which includes either Doppler frequency, phase difference, or preferably range rate for each RAG. The apparatus illustrated in FIG. 4 specifically illustrates the storage of median range rate. However, phase difference or Doppler shift could alternatively have been used by providing additional conversion units since these values are easily converted from one to another.

The conversion unit 408 converts the median range rate (or other representation of sea velocity) stored in the storage unit 414 into a median phase difference for the currently used carrier frequency and interpulse period. The conversion unit 408 may employ multipliers or a programmable read-only memory (PROM) containing a look-up table for making the conversions. The preferred embodiment is designed for use with frequency agile radars in which the carrier frequency can change after a burst of pulses and interpulse period can change with any pulse. Thus, the conversion unit 408 calculates an appropriate median phase difference in accordance with equation (1) for every pair of echo signals based upon the frequency used and the time delay between the pair of echo signals.

Preferably as the processing of the signals within the predetermined segment continues, the count value stored in the up/down counter 410 is sent to the conversion unit 408 under the control of the control unit 412 to calculate an up-to-date median phase difference. Thus, the modulo subtractor 406 always uses the most accurate median phase difference available. Although it is not as accurate, the initial median phase difference associated with the initial count value could be used throughout the processing of all the signals within a RAG.

When all the echo signals of the predetermined segment have been processed, the control unit 412 stores the count value contained in the up/down counter 410 in the storage unit 414 to update the median range rate for the RAG which just ended. Thereafter, the filter selection unit 416 selects a sea clutter rejection filter for the next RAG to be processed using the median range rate previously stored in the storage unit 414 for that RAG. The median range rate is modified by the carrier frequency in the filter selection unit 416 to convert to median Doppler frequency. This is most important at higher sea velocities where the adjustment for Doppler shifting causes the selection of a different filter from that which would be selected if the median range rate alone was used. The control unit 412 controls the filter selection process at the end of each RAG.

As a result, a rejection filter centered on the median range rate of the sea velocity for a given predetermined segment can be selected in order to suppress sea clutter. As noted above, the present invention is also very flexible in that it can readily compensate for changes in both the interpulse period and the carrier frequency. The system compensates for a change in carrier frequency by the conversion of range rate into Doppler frequency in the filter selection unit 416 and compensates for both frequency and interpulse period variation by the conversion into phase difference in conversion unit 408. Neither of the prior art techniques were able to immediately compensate for changes in carrier frequency.

Since radar systems generally transmit a fixed pattern variation of a pulse, radar systems have advance information regarding the time difference between pulses (i.e., interpulse period). Further, the carrier frequency or frequencies currently in use is available. The present invention can be used with a radar system simultaneously using two different transfer or carrier frequencies. The preferred embodiment of the present invention can be used in a radar system in which each transmission consists of two pulses of different frequencies in succession. The echo signals for each of the different frequencies are processed separately, although in a like manner, thus doubling the number of independent samples of sea echo available for estimating median range rate. The processing will select slightly different rejection filters because of the difference in Doppler frequency of the corresponding echo signals. However, due to the design of the preferred embodiment illustrated in FIG. 4, a change in carrier frequency does not hinder the operation of the invention because frequency compensation is provided.

The many features and advantages of the present invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A method for determining radial sea velocity from radar echo signals, said method comprising the steps of:
    (a) dividing a radar scan into a plurality of coverage areas;
    (b) computing the radial sea velocity for each of the coverage areas based on the radar echo signals received therefrom, said computing computes a median radial sea velocity for each of the coverage areas; and
    (c) storing the median radial sea velocity for each of the coverage areas.

2. A method as recited in claim 1,
    further comprising the step of (d) receiving a plurality of preceding and subsequent radar echo signals for each of the coverage areas, and
    wherein said computing in step (b) comprises the steps of:
    (b1) computing a phase difference between the preceding and subsequent radar echo signals;
    (b2) receiving an indication of a time period between the preceding and subsequent radar echo signals and the carrier frequency used to produce the preceding and subsequent signals; and
    (b3) determining the median radial sea velocity based on the phase difference, the carrier frequency and the time period between the preceding and subsequent radar echo signals.

3. A method as recited in claim 2, wherein said dividing in step (a) divides the radar scan by range and azimuth to form the coverage areas.

4. A method as recited in claim 3,
    wherein the coverage areas include land portions and sea portions, and
    wherein said method further comprises the step of (e) eliminating, prior to said computing in step (b), the preceding and subsequent radar echo signals corresponding to the land portions.

5. A method for removing sea clutter from radar echo signals in a radar scan, said method comprising the steps of:
    (a) receiving preceding and subsequent radar echo signals;
    (b) computing a phase difference between the preceding and subsequent radar echo signals;
    (c) updating a median value based on the phase difference; and
    (d) selecting a sea clutter rejection filter based on the median value.

6. A method as recited in claim 5,
    wherein the preceding and subsequent radar echo signals are from one of a plurality of predetermined segments of a radar scan, and
    wherein a storage period separates the preceding and subsequent radar echo signals by a plurality of interpulse periods.

7. A method as recited in claim 6, wherein said selecting in step (d) selects the sea clutter rejection filter for each of the predetermined segments.

8. A method as recited in claim 6, wherein the median value corresponds to radial sea velocity within the predetermined segments of the radar scan.

9. A method as recited in claim 8,
    wherein the predetermined segments are coverage areas formed by dividing the radar scan by range and azimuth, and
    wherein said selecting in step (d) is performed each time processing begins for one of the predetermined segments.

10. A method as recited in claim 9,
    wherein the coverage areas include land portions and sea portions, and
    wherein said method further comprises the step of (e) eliminating, prior to said computing in step (b), the preceding and subsequent radar echo signals corresponding to the land portions.

11. A method for selecting a sea clutter rejection filter to remove sea clutter from radar signals, said method comprising the steps of:
    (a) receiving first and second echo signals for a predetermined segment of a radar scan;
    (b) delaying the first echo signal by at least one interpulse period;
    (c) computing a measured phase difference between the preceding and subsequent echo signals;
    (d) initiating a count value based upon a stored median range rate corresponding to the predetermined segment;
    (e) Converting the stored median range rate, corresponding to the predetermined segment, to a median phase difference;
    (f) comparing the measured phase difference with the median phase difference;
    (g) increasing the count value when said comparing in step (f) indicates the measured phase difference is less than the median phase difference;
    (h) decreasing the count value when said comparing in step (f) indicates the measured phase difference is greater than the median phase difference;
    (i) updating the stored median range rate for the predetermined segment based on the count value; and
    (j) selecting the sea clutter rejection filter based on the stored median range rate when the predetermined segment is processed in a subsequent radar scan.

12. A method as recited in claim 11,
wherein the radar scan is divided into a plurality of predetermined segments, each having a beginning and an end; and
wherein said method further comprises step (k) repeating steps (a)-(h) until the end of the predetermined segment has been reached.

13. An apparatus for removing sea clutter from radar echo signals, said apparatus comprising:
control means for receiving the radar echo signals for predetermined segments of a radar scan and for determining a median value corresponding to sea velocity for each of the predetermined segments based on the radar echo signals; and
filter selection means for selecting a sea clutter rejection filter for each of the predetermined segments based on the median value determined by said control means.

14. An apparatus as recited in claim 13,
wherein the predetermined segments are coverage areas formed by dividing the radar scan by range and azimuth, and
wherein said apparatus further comprises storage means for storing the median value for each of the predetermined segments.

15. An apparatus for removing sea clutter from radar echo signals, the radar echo signals spaced apart by a variable interpulse period, said apparatus comprising:
phase detection means for determining an undelayed phase value of preceding and subsequent radar echo signals;
first storage means for storing the undelayed phase value of the preceding radar echo signal to delay the undelayed phase value by at least one interpulse period to produce a stored phase value of the preceding radar echo signal;
phase difference detection means for detecting a measured phase difference between the undelayed phase value of the subsequent radar echo signal and the stored phase value of the preceding radar echo signal, and for outputting sea clutter information corresponding to the measured phase difference;
second storage means for storing median sea clutter information;
comparison means for comparing the sea clutter information with the median sea clutter information and for producing a comparison result;
update means for updating the median sea clutter information stored in said second storage means based on the comparison result; and
removal means for removing the sea clutter based upon the median sea clutter information stored in said second storage means.

16. An apparatus as recited in claim 15,
wherein the sea clutter information is one of the measured phase difference and a range rate value corresponding to the measured phase difference, and
wherein said comparison means includes conversion means for converting the median sea clutter information into units associated with the median sea clutter information.

17. An apparatus as recited in claim 15, wherein the preceding and subsequent radar echo signals and the median sea clutter information correspond to one of a plurality of predetermined segments of a scan.

18. An apparatus as recited in claim 15, wherein said removal means comprises:
a plurality of rejection filters; and
filter selection means for selecting one of said rejection filters based on the median sea clutter information.

* * * * *